US012631730B2

(12) United States Patent
Li et al.

(10) Patent No.: US 12,631,730 B2
(45) Date of Patent: May 19, 2026

(54) LIGHT DETECTION AND RANGING SYSTEM AND MOBILE DEVICE

(71) Applicant: LightIC Technologies HK Limited, Hong Kong (CN)

(72) Inventors: Zhi Li, Santa Clara, CA (US); Tianbo Sun, Santa Clara, CA (US); Guomin Jiang, Santa Clara, CA (US); Ziyun Kong, Santa Clara, CA (US); Jie Sun, Santa Clara, CA (US)

(73) Assignee: LightIC Technologies HK Limited, Hong Kong (CN)

( * ) Notice: Subject to any disclaimer, the term of this patent is extended or adjusted under 35 U.S.C. 154(b) by 39 days.

(21) Appl. No.: 18/593,119

(22) Filed: Mar. 1, 2024

(65) Prior Publication Data

US 2025/0277894 A1      Sep. 4, 2025

(51) Int. Cl.
*G01S 7/481* (2006.01)
*G01S 7/486* (2020.01)
*G01S 17/58* (2006.01)
*G02B 6/293* (2006.01)

(52) U.S. Cl.
CPC .......... *G01S 7/4815* (2013.01); *G01S 7/4816* (2013.01); *G01S 7/4868* (2013.01); *G01S 17/58* (2013.01); *G02B 6/2938* (2013.01)

(58) Field of Classification Search
CPC .............................. G01S 17/58; G02B 6/2938
See application file for complete search history.

(56) References Cited

U.S. PATENT DOCUMENTS

| | | | |
|---|---|---|---|
| 6,388,782 B1 * | 5/2002 | Stephens | H04J 14/0204 |
| | | | 372/18 |
| 11,320,522 B1 * | 5/2022 | Avci | G01S 17/58 |
| 2005/0063636 A1 * | 3/2005 | Joyner | G02B 6/12023 |
| | | | 385/14 |
| 2012/0206712 A1 * | 8/2012 | Chang | G01S 17/87 |
| | | | 356/28 |
| 2019/0257927 A1 * | 8/2019 | Yao | G01S 7/4815 |
| 2019/0391243 A1 * | 12/2019 | Nicolaescu | G01S 17/42 |
| 2021/0141058 A1 * | 5/2021 | Piggott | G01S 7/4861 |
| 2022/0404470 A1 * | 12/2022 | Asghari | G01S 7/4917 |

FOREIGN PATENT DOCUMENTS

| | | | | |
|---|---|---|---|---|
| CN | 115407313 A | * 11/2022 | | G01S 17/34 |
| EP | 1863202 A1 | * 12/2007 | | H04B 10/0775 |

OTHER PUBLICATIONS

Machine translation of CN-115407313-A (Year: 2022).*

* cited by examiner

Primary Examiner — Yuqing Xiao
Assistant Examiner — Zhengqing Qi
(74) Attorney, Agent, or Firm — IPro, PLLC

(57) ABSTRACT

A light detection and ranging system and a mobile device are provided. The system includes laser light sources, an optical switch component and an optical chip. Wavelengths of the optical signals emitted by the laser light sources are different. The optical switch component includes optical switches and a wavelength division multiplexer. The wavelength division multiplexer includes first input ends and a first output end, each first input end is optically connected to an optical switch, and the first output end outputs optical signals of different wavelengths in a time-division manner.

12 Claims, 6 Drawing Sheets

LIGHT DETECTION AND RANGING SYSTEM AND MOBILE DEVICE

TECHNICAL FIELD

The present disclosure relates to the field of light detection and ranging technology, and in particular, to a light detection and ranging system and a mobile device.

BACKGROUND

A light detection and ranging (LiDAR) system is a relatively advanced sensor at present, and has been widely used in many fields, such as autonomous driving, logistics and transportation, high-precision maps, smart transportation, robots, industrial automation, drones, surveying and mapping, etc. LiDAR is the "eye" of autonomous driving due to its strong anti-interference and clear imaging characteristics, and is regarded as one of the most important sensors in the autonomous driving.

In order to meet high line beam requirement, multiple channels of laser light sources and detectors are installed inside the casing of the LiDAR. When the number of line beams in the LiDAR is increased, captured details of objects are richer, that is, a resolution of the LiDAR is higher, a point cloud image being generated is obviously clearer. However, when there are multiple channels inside the LiDAR, it will inevitably cause the LiDAR to be bulky.

SUMMARY

In a first aspect, a light detection and ranging system is provided. The system includes:

at least two laser light sources, wherein the at least two laser light sources are configured to emit at least two optical signals, and wavelengths of the at least two optical signals emitted by the at least two laser light sources are different;

an optical switch component, wherein the optical switch component includes at least two optical switches and a wavelength division multiplexer optically connected to the at least two optical switches, and a quantity of the at least two optical switches is equal to a quantity of the at least two laser light sources; each of the at least two optical switches is optically connected to a corresponding one of the at least two laser light resources, and the wavelength division multiplexer includes at least two first input ends and a first output end, each of the at least two first input ends is optically connected to one optical switch of the at least two optical switches to receive an optical signals passing through the one optical switch, and the first output end of the wavelength division multiplexer outputs the at least two optical signals of at least two laser light resources;

an optical chip, configured to emit a portion of each of the at least two optical signals and receive a return optical signal reflected by a target object after the portion of each of the at least two optical signals is incident on the target object, and detect the return optical signal, wherein the return optical signal is used to calculate a distance and/or a speed of the target object relative to the light detection and ranging system.

Optionally, the optical chip divides each of the at least two optical signals into a detection optical signal and a local oscillation optical signal, the light detection and ranging system further includes:

a dispersion component, arranged on a light existing path of the optical chip and configured to deflect detection optical signals of the at least two optical signals at different deflection angles.

Optionally, the dispersion component includes a grating and/or a prism.

Optionally, the optical switch includes at least two semiconductor optical amplifiers, each of the at least two semiconductor optical amplifiers is configured to amplify a corresponding one of the at least two optical signals, wherein the at least two semiconductor optical amplifiers are turned on in a time-division manner, so that the first output end of the wavelength division multiplexer outputs the at least two optical signals in a time division manner.

Optionally, the system further includes:

a first beam splitting component, arranged between the wavelength division multiplexer and the optical chip, and including a second input end and at least two second output ends, wherein the second input end is connected to the first output end of the wavelength division multiplexer, and the first beam splitting component is configured to split each of the at least two optical signals into at least two optical sub-signals, the at least two optical sub-signals are outputted through the at least two second output ends;

wherein, the optical chip includes at least two beam splitters, each of the two beam splitters is optically connected to one of the at least two second output ends, and is configured to split each of the at least two optical sub signals into a detection optical signal and a local oscillation optical signal.

Optionally, the first beam splitting component includes: a first beam splitting sub-component, including the second input end and at least two first intermediate output ends, wherein the first beam splitting sub-component is configured to receive, via the second input end, the at least two optical signals outputted from the first output end, and outputs a part of the at least two optical signals through each of the first intermediate output ends.

Optionally, the first beam splitting sub-component includes at least two stages of first beam splitters, an output end of a first beam splitter in a first stage of the at least two stages is optically connected to an input end of a first beam splitter in a second stage of the at least two stages.

Optionally, the at least two stages of first beam splitters include S stages of first beam splitters, one or more output ends of one or more first beam splitters in a (S−1)-th stage of the S stages and output ends of one or more first beam splitters in a S-th stage are used as the at least two second output ends, wherein S is a positive integer larger than or equal to 1.

Optionally, the optical chip further includes at least two second beam splitting sub-components, each of the at least two second beam splitting sub-components is optically connected to one of the at least two first intermediate output ends, and each of the at least two second beam splitting sub-components includes a first intermediate input end and at least two fifth output ends, each first intermediate input end is optically connected to a corresponding first intermediate output end of the at least two first intermediate output ends, and each of the at least two second beam splitting sub-components is configured to receive, via the first intermediate input end, a portion of the at least two optical signals outputted by the corresponding first intermediate output end, and output an optical signal of a portion of the at least two optical signals via each of the at least two fifth output ends.

Optionally, the system further includes:

at least two first optical amplifiers, wherein each of the at least two first optical amplifiers is optically connected to one of the at least two first intermediate output ends and one of the at least two intermediate input ends, and is configured to amplify an optical signal outputted from the one of the at least two first intermediate output ends.

Optionally, the system further includes:

an optical wavelength demultiplexer, including a third input end and at least two third output ends, wherein the third input end is connected to the first output end of the wavelength division multiplexer, the at least two third output ends output the at least two optical signals in a time-division manner;

wherein the optical chip further includes at least two beam splitters, each of the at least two beam splitters is optically connected to one of the at least two third output ends, and is configured to split one of the at least two optical signals into a detection optical signal and a local oscillation optical signal.

Optionally, the optical chip further includes: at least two second beam splitting components, each of the at least two second beam splitting components is optically connected to one of the at least two third output ends, and each of the second beam splitting components includes a fourth input end and at least two fourth output ends, each fourth input end is optically connected to one of the at least two third output ends, and each of the at least two second beam splitting components is configured to receive, via the fourth input end, an optical signal outputted by a corresponding third output end of the at least two third output ends, and output a part of each of the at least two optical signals via the at least two fourth output ends.

Optionally, each of the at least two second beam splitting components includes a fifth beam splitter and at least two sixth beam splitters, an input end of the fifth beam splitter serves as the fourth input end, at least one output end of the fifth beam splitter is connected to an input end of at least one of the at least two sixth beam splitters, and at least one output end of one fifth beam splitter and/or output ends of the at least two sixth beam splitters serve as the at least two fourth output ends.

Optionally, the at least two second beam splitting components adopt a non-uniform beam splitting ratio.

Optionally, each of the at least two second beam splitting components includes S stages of optical switches, and an input end of each optical switch in a first stage of the S stages serves as the fourth input end, and an output end of at least one optical switch in a previous stage of the S stages is connected to an input end of an optical switch in a next stage of the S stages, and an output end of optical switches in a S-th stage serves as the at least two fourth output ends, wherein S is an integer greater than 1.

Optionally, each of the at least two second beam splitting components includes S stages of optical switches, and an input end of each optical switch in a first stage of the S stages serves as the fourth input end, and an output end of at least one optical switch in a previous stage of the S stages is connected to an input end of an optical switch in a next stage of the S stages, and an output end of at least one optical switch in a (S−1)-th stage and an output end of optical switches in a S-th stage serves as the at least two fourth output ends, wherein S is an integer greater than 1.

Optionally, the system further includes: a second optical amplifier, wherein the second optical amplifier is optically connected between the first output end of the wavelength division multiplexer and the third input end of the optical wavelength demultiplexer, and is configured to amplify the at least two optical signals.

Optionally, the optical chip includes:

at least two beam splitters, configured to split each of the at least two optical signals into a local oscillation optical signal and a detection optical signal;

an optical transmitting and receiving unit, configured to receiving the detection optical signal from the at least two beam splitters and transmit the detection optical signal to an external environment and receives a return optical signal formed by reflection of the detection optical signal incident on the target object;

an optical mixer, configured to receive the local oscillation optical signal from the at least two beam splitters and mix the return optical signal with the local oscillation optical signal to generate a mixed signal;

a balanced detector, configured to receive the mixed signal from the optical mixer and converts the mixed signal into an electrical signal to facilitate subsequent calculation of the distance and/or the speed of the target object relative to the light detection and ranging system.

Optionally, the optical transmitting and receiving unit includes a polarization splitting rotator and a coupler, the polarization splitting rotator is located at a light outgoing path of the detection optical signal outputted by the beam splitter, the coupler is located on a light outgoing path of the detection optical signal outputted by the polarization splitting rotator, and the polarization splitting rotator is also located on a light return path of a return optical signal received by the optical mixer, the coupler is also located on a light return path of the return optical signal received by the polarization splitting rotator.

In a second aspect, a mobile device is provided. The device includes a light detection and ranging system according to the above first aspect.

BRIEF DESCRIPTION OF THE DRAWINGS

In order to describe technical solutions in the embodiments of the present disclosure more clearly, drawings needed to be used in description of the embodiments of the present disclosure will be briefly introduced below. Obviously, the drawings in the following description are only some embodiments of the present disclosure. Those of ordinary skill in the art can obtain other drawings based on these drawings without exerting creative efforts.

EXPLANATION OF REFERENCE SYMBOLS

1. LiDAR; 10. Laser light source; 20. Optical switch component; 21. Optical switch; 22. Wavelength division multiplexer; 221. First input end; 222. First output end; 30. Optical chip; 31. Beam splitter (BS); 32. Optical transmitting and receiving unit (OTR); 321. Polarization splitting rotator; 322. Coupler; 33. Optical mixer; 34. Balanced detector; 35. Second beam splitting component; 351. Fourth input end; 352. Fourth output end; 40. Dispersion component; 41. Grating;

50. First beam splitting component; 51. First beam splitting sub-component; 511. Second input end; 512. First intermediate output end; 513. Beam splitter; 5131. First beam splitter; 5132. Second beam splitter; 52. Second beam splitting sub-component; 521. First intermediate input end; 522. Second output end; 523. Beam splitter; 5231. Third beam splitter; 5232. Fourth beam splitter; 525. Fifth output end

60. Optical wavelength demultiplexer; 61. Third input end; 62. Third output end;

70. First optical amplifier; 80. Second optical amplifier; 90. Lens;

2. Mobile device;

a1. Optical signal of a first wavelength; a2. Optical signal of a second wavelength; a3. Optical signal of a third wavelength; a4. Optical signal of a fourth wavelength.

DETAILED DESCRIPTION

In order to make objectives, technical solutions and advantages of the present disclosure clearer, the embodiments of the present disclosure will be described in further detail below with reference to the accompanying drawings.

When the following description refers to the drawings, the same reference symbols in different drawings refer to the same or similar elements unless otherwise indicated. Implementations described in the following exemplary embodiments do not represent all implementations consistent with the present disclosure, but are merely examples of apparatus and methods consistent with certain aspects of the present disclosure, as detailed in the appended claims.

Figure 1:
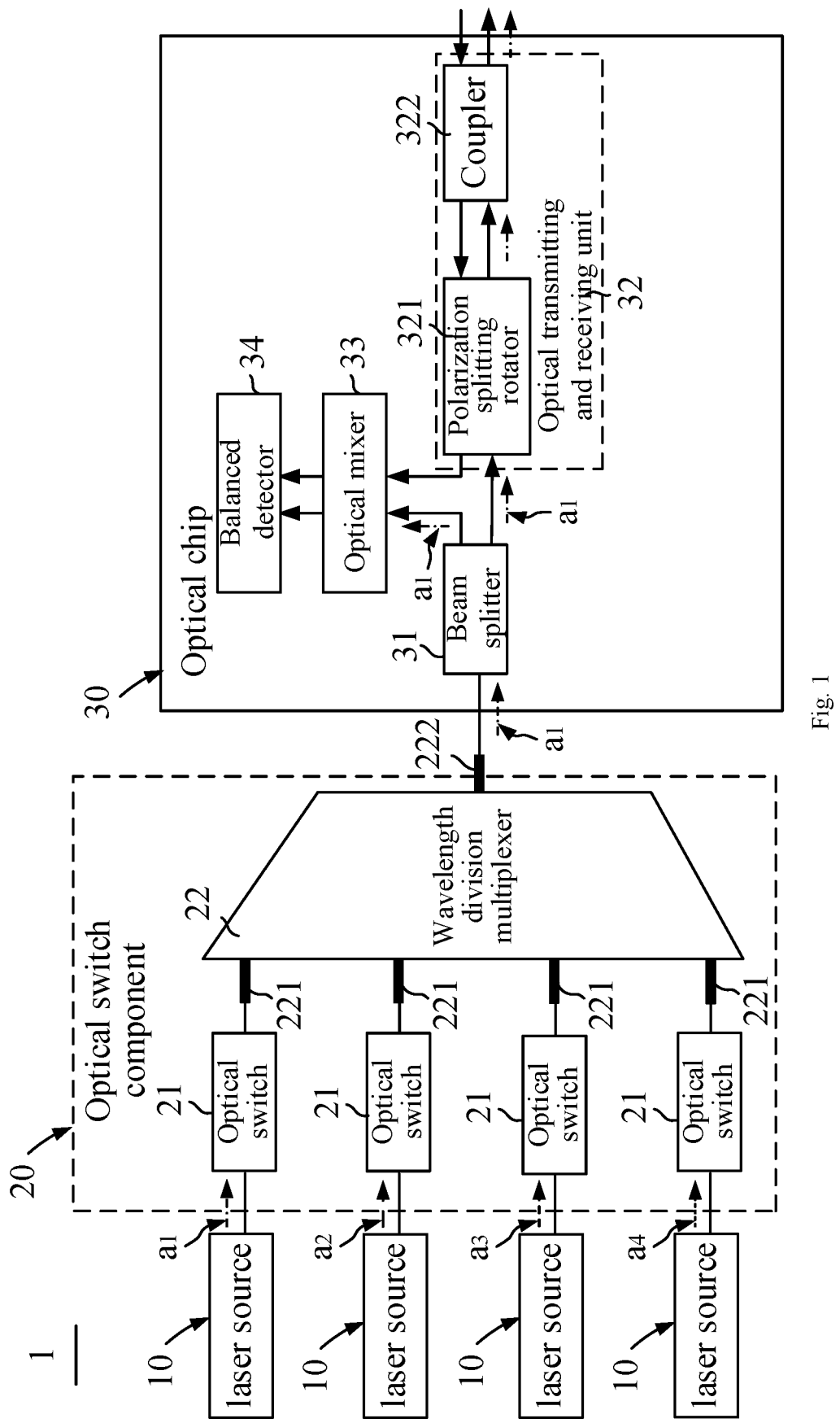
FIG. 1 is a schematic diagram of a LiDAR provided by some embodiments of the present disclosure.

Embodiments of the present disclosure provide a Light Detection And Ranging (LiDAR) and a mobile device, which can improve the problem in related art that the LiDAR is bulky when multiple channels are provided inside the LiDAR. Referring to FIG. 1, the embodiments of the present disclosure provide a Frequency Modulated Continuous Wave (FMCW) LiDAR 1. FMCW is a technology used in high-precision radar ranging. A basic principle of the FMCW is that an emitted wave is a high-frequency continuous wave, a frequency of which changes with time according to a triangular waveform or a sawtooth waveform; the LiDAR 1 uses the frequency modulated continuous wave technology. The frequency of an echo (i.e., a reflected wave) received by the LiDAR 1 changes according to a rule same as a changing rule of the frequency of the emitted light wave, both are triangular waveforms or sawtooth waveforms, however there is time difference between the emitted light wave and the reflected wave. This tiny time difference can be used to calculate the distance and the speed of a target object. LiDAR 1 has advantages of a large detection range and direct speed measurement using the Doppler effect.

Specifically, the LiDAR 1 of the present disclosure includes at least two laser light sources 10, an optical switch component 20 and an optical chip 30.

The at least two laser light sources 10 are configured to emit optical signals, and wavelengths of the optical signals emitted by different laser light sources 10 are different from each other. As an example, optical signals emitted by four laser light sources 10 shown in FIG. 1 respectively correspond to an optical signal a1 of a first wavelength, an optical signal a2 of a second wavelength, an optical signal a3 of a third wavelength, an optical signal a4 of a fourth wavelength, and the first wavelength, the second wavelength, the third wavelength and the fourth wavelength are different from each other.

The optical switch component 20 includes at least two optical switches 21 and a wavelength division multiplexer (Multiplexer, MUX) 22 optically connected to the at least two optical switches 21, wherein the number of the at least two laser light sources 10 is equal to the number of the at least two optical switches 21. Each optical switch 21 is optically connected to a corresponding laser light source 10 in one-to-one correspondence. The wavelength division multiplexer 22 includes at least two first input ends 221 and a first output end 222. Each first input end 221 is optically connected to a corresponding optical switch 21 in one-to-one correspondence and receives an optical signal from the corresponding optical switch 21, and the first output end 222 of the wavelength division multiplexer 22 outputs optical signals with different wavelengths in a time division manner. It should be noted that optical connections in the embodiments of the present disclosure may be a spatial optical path connection, a waveguide connection, an optical fiber connection, etc., and are not limited thereto.

The optical chip 30 includes a beam splitter (BS) 31, an optical transmitting and receiving (OTR) unit 32, an optical mixer 33 and a balanced detector 34. The beam splitter 31 separates the optical signal, outputted from the first output end 222 of the wavelength division multiplexer 22, into a local oscillation optical signal and a detection optical signal. The optical transmitting and receiving unit 32 receives the detection optical signal from the beam splitter 31 and transmits the detection optical signal into the external environment and receives a returned optical signal formed by the target object reflecting the detection optical signal. The optical mixer 33 receives the local oscillation optical signal from the beam splitter 31 and mixes the return optical signal with the local oscillation optical signal to generate a mixed signal. The balanced detector 34 receives the mixed signal from the optical mixer 33 and converts the mixed signal into an electrical signal to facilitate subsequent calculation of a distance and/or a speed of the target object relative to the LiDAR.

In the embodiments of the present disclosure, at least two laser light sources 10 are provided, and the optical signals emitted by the at least two laser light sources 10 can be output through the first output end 222 of the wavelength division multiplexer 22. In this way, the optical signals emitted from the at least two laser light sources 10 can all pass through the beam splitter 31, the optical transmitting and receiving unit 32, the optical mixer 33 and the balanced detector 34 on the optical chip 30, so as to realize that the optical signals emitted from at least two laser light sources 10 can all be used to detect the target object. Compared with the related art where only one laser light source is provided and the one laser light source corresponds to an beam splitter, an optical transmitting and receiving unit, an optical mixer and a balanced detector, at least two laser light sources 10 in the embodiments of the present disclosure can reduce the number of the beam splitters 31, the optical transmitting and receiving units 32, the optical mixers 33 and the balanced detectors 34 on the optical chip 30 in case that the same number of channels is detected by both the one laser light source and the at least two laser light sources, and can reduce the size of the optical chip 30 and realize miniaturization of the LiDAR 1. Additionally, since multiple beam splitters, multiple optical transceivers and receivers, multiple optical mixers and multiple balanced detectors are configured, the line number of vertical scanning in the LiDAR is increased without increasing the actual number of laser sources and the output of a trans-impedance amplification chip (TIA).

The first output end 222 of the wavelength division multiplexer 22 outputs optical signals with different wavelengths in a time-division manner. The time-division manner can be understood as follows: at the same time instant, the first output end 222 of the wavelength division multiplexer 22 only outputs an optical signal of one wavelength, a situation where the first output end 222 outputs optical signals of multiple wavelengths at the same time instant will not occur. For example, the first output end 222 of the wavelength division multiplexer 22 outputs the optical signal a1 of the first wavelength at a certain time instant shown in FIG. 1 and FIG. 2*a*; and for another example, the first output end 222 of the wavelength division multiplexer 22 outputs the optical signal a2 of the second wavelength at another time instant shown in FIG. 2*b*.

In order to realize that the first output end 222 of the wavelength division multiplexer 22 outputs optical signals with different wavelengths in a time-division manner, the above-mentioned at least two laser light sources may be configured to emit the optical signals in a time-division manner, or the above-mentioned at least two optical switches 21 may also be configured to be switched on in a time-division manner.

In the embodiments of the present disclosure, each of the optical switches 21 includes a semiconductor optical amplifier (SOA) 211, and each semiconductor optical amplifier 211 of the optical switch component 20 is turned on in a time-division manner. That is, by configuring each semiconductor optical amplifier 211 to be turned on in a time-division manner, the first output end 222 of the wavelength division multiplexer 22 outputs optical signals with different wavelengths in a time-division manner.

Controlling the semiconductor optical amplifier 211 to be switched on or switched off can be realized directly by powering on or powering off the semiconductor optical amplifier 211. For example, if the semiconductor optical amplifier 211 is powered on, the semiconductor optical amplifier 211 can be turned on, and if the semiconductor optical amplifier 211 is powered off, the semiconductor optical amplifier 211 can be turned off. Since the semiconductor optical amplifier 211 can be switched on or switched off frequently and the laser light sources 10 generally will not be switched on or switched off frequently, controlling the semiconductor optical amplifier 211 to be switched on or switched off is more operable than controlling the laser light sources 10 to be switched on or switched off. Moreover, the semiconductor optical amplifiers 211 can be turned on in a time-division manner, that is, the semiconductor optical amplifiers 211 are powered on in a time-division manner. Compared with the semiconductor optical amplifier 211 that is continuously powered on, in a normal on state, and outputs the average power, the semiconductor optical amplifier 211 can output a peak power and the outputted power is higher, which is beneficial to improve a light signal amplification effect.

When the semiconductor optical amplifier 211 is turned on, the optical signal emitted by the laser light source 10 can be amplified and outputted. When the semiconductor optical amplifier 211 is turned off, the optical signal emitted by the laser light source 10 can be absorbed so that the optical signal is not outputted. In this way, all laser light sources 10 can be in the normal-on state, and even if all laser light sources 10 are in the normal-on state, the optical signal of the laser light source 10 can be amplified and outputted only when the corresponding semiconductor optical amplifier 211 is turned on, and when the semiconductor optical amplifier 211 is turned off, the optical signal of the corresponding laser light source 10 cannot be outputted. Since both the above-mentioned at least two laser light sources 10 are in the normal-on state, a control process of the laser light sources 10 can be simplified and the manufacturing cost of the LiDAR 1 can be reduced.

Semiconductor optical amplifiers 211 can be SOA, erbium-doped fiber amplifiers (EDFA), Praseodymium-Doped Fiber Amplifier (PDFA) and other types of optical amplifiers.

In some optional embodiments, time-division output of the at least two optical signals can also be achieved through series connection of multiple stages of 2-to-1 switches. Each 2-to-1 switch has two input ends and one output end and is configured to select one of signals inputted into the two input ends and output the selected signal through the one output end. For polychromatic light with a small wavelength spacing, the 2-to-1 switches can be implemented by using cascaded MZM on a silicon optical chip. An array of the 2-to-1 switches can be integrated with an emission/detection chip of the LiDAR, or can be a separate chip. Each of two input ends of each 2-to-1 switch in each stage of the multiple stages of the 2-to-1 switches is connected to one output end of a 2-to-1 switch in a previous stage. The output end of the 2-to-1 switch is connected to one input end of a 2-to-1 switch in the next stage. For the optical signals outputted by N laser light sources, a total of $Log_2$ (N) stages of 2-to-1 switches are required.

When the first output end 222 of the wavelength division multiplexer 22 outputs optical signals of different wavelengths in a time-division manner, an order in which the first output end 222 outputs the optical signals of different wavelengths can be arbitrary. For example, the first output end 222 outputs optical signals of different wavelengths in a periodic order, or the first output end 222 outputs optical signals of different wavelengths in a random order, or the first output end 222 outputs optical signals of different wavelengths in a random order within a certain time period and outputs optical signals of different wavelengths in a periodic order within another certain time period, etc., the present disclosure is not limited thereto.

If the first output end 222 outputs optical signals of different wavelengths in a periodic order at least within a certain time period, the optical signals of the laser light sources 10 are outputted in sequence following an arrangement sequence of the at least two laser light sources 10 within the time period and the optical signals corresponding to all the laser light sources 10 are traversed; or the optical signals corresponding to the laser light sources 10 are sequentially outputted in sequence following an arrangement sequence of the at least two laser light sources 10, and after traversing all the laser light sources 10, the optical signals corresponding to the laser light sources 10 are outputted in a sequence opposite to the arrangement sequence of the at least two laser light sources 10, and all the laser light sources 10 are traversed in one time period; or optical signals corresponding to the laser light sources 10 in odd-numbered rows are outputted first, and then optical signals corresponding to the laser light sources 10 in even-numbered rows are outputted thereafter. The present disclosure is not limited thereto.

In the embodiments of the present disclosure, the number of laser light sources 10 included in the LiDAR 1 can be two or more, for example, two, three, four, five, six, etc., which can be flexibly designed according to actual needs. The present disclosure is not limited thereto. Light emission directions of the at least two laser light sources 10 may be substantially parallel, and the at least two laser light sources 10 may be arranged in sequence and spaced apart along a direction perpendicular to the light emission direction.

Figure 2A:
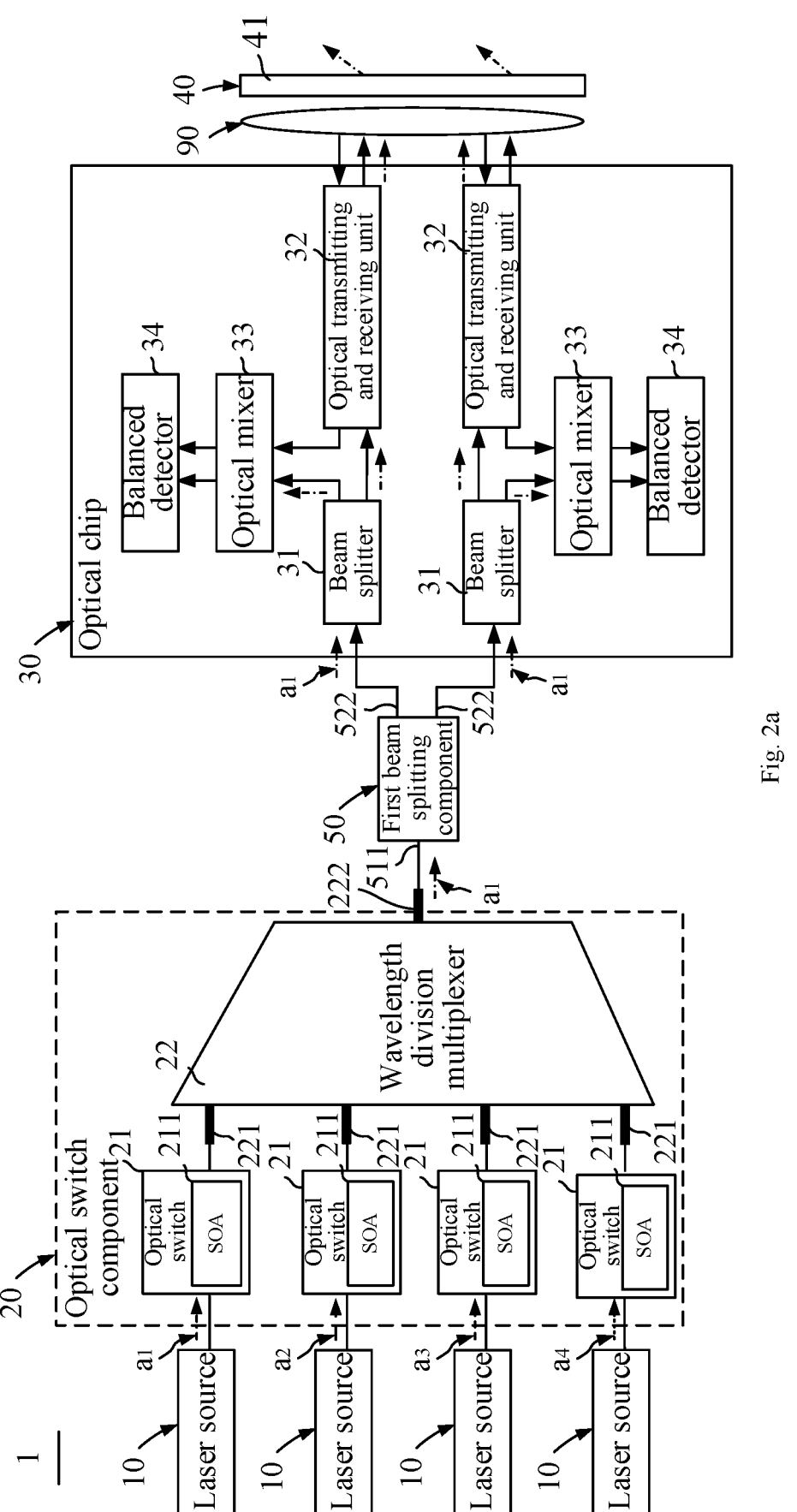
FIG. 2a is a schematic diagram of optical transmission paths in a working state of the LiDAR provided by some embodiments of the present disclosure.
Figure 2B:
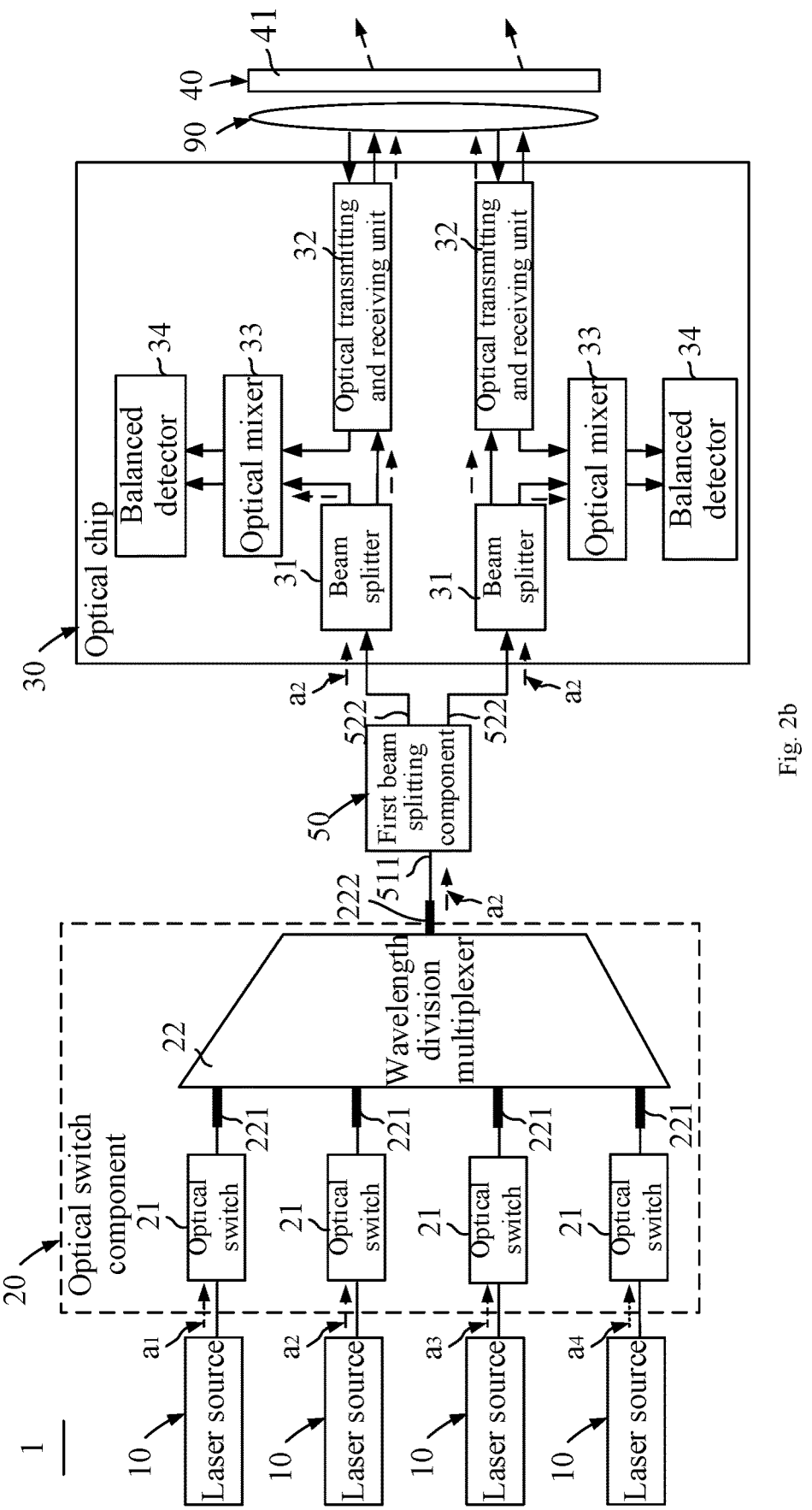
FIG. 2b is a schematic diagram of optical transmission paths in another working state of the LiDAR provided by some embodiments of the present disclosure.

Referring to FIG. 2*a* and FIG. 2*b*, the LiDAR 1 also includes a first beam splitting component 50. The first beam splitting component 50 includes a second input end 511 and at least two second output end 522. The second input end 511 is connected to the first output end 222 of the wavelength division multiplexer 22. The first beam splitting component 50 is configured to receive, via the second input end 511, the optical signal outputted by the first output end 222, and output an optical signal via each second output end 522.

That is, the optical signal outputted by the first output end 222 of the wavelength division multiplexer 22 can be outputted through the at least two second output ends 522, thereby converting one optical signal into multiple optical signals. In this way, after the above-mentioned at least two laser light sources 10 both output optical signals, the first beam splitting component 50 will cumulatively output more optical signals.

For example, if the LiDAR 1 includes M laser light sources 10 and the first beam splitting component 50 includes a second input end 511 and N second output ends 522, then after the optical signal outputted by one laser light source 10 passes through the first beam splitting component 50, the N second output ends 522 of the first beam splitting component 50 can output N optical signals. The optical signals outputted by the M laser light sources 10 can pass through the first beam splitting component 50 and the N second output ends 522 of the first beam splitting component 50 can output M*N optical signals. M and N may be equal or different, and the present disclosure is not limited thereto. Both M and N can be integers greater than 1.

If each second output end 522 of the first beam splitting component 50 outputs an optical signal, the optical chip 30 includes at least two beam splitters 31, at least two optical transmitting and receiving units 32, at least two optical mixers 33 and at least two balanced detectors 34. Each beam splitter 31 is optically connected to a corresponding one second output end 522 in a one-to-one correspondence. Each beam splitter 31 is optically connected to a corresponding optical transmitting and receiving unit 32 in a one-to-one correspondence. Each optical transmitting and receiving unit 32 is optically connected to a corresponding optical mixer 33 in a one-to-one correspondence. Each optical mixer 33 is optically connected to a corresponding beam splitter 31 in a one-to-one correspondence. Each optical mixer 33 is optically connected to a corresponding balanced detector 34 in a one-to-one correspondence. In this way, the optical signal outputted by each second output end 522 can be emitted to the external environment, so that the LiDAR 1 can detect the distance and/or speed information of the target object relative to the LiDAR 1 in the external environment.

It should be noted that the optical signal outputted by one of the above at least two laser light sources 10 passes through the wavelength division multiplexer 22 and the first beam splitting component 50, and then is outputted by each second output terminal 522 of the first beam splitting component 50. The optical signal outputted by another laser light source 10 passes through the wavelength division multiplexer 22 and the first beam splitting component 50, and is also outputted by each second output end 522 of the first splitting component 50, and after the optical signal outputted by the different laser light sources 10 pass through the first beam splitting component 50, and since the emission direction of the same second output end 522 of the first beam splitting component 50 may be identical, a detection area when detecting the target object may be the same, which is not conducive to improving a detective field of view angle of the LiDAR. Based on this, referring to FIG. 2*a* and FIG. 2*b*, the LiDAR 1 of the embodiments of the present disclosure also includes a dispersion component 40. The dispersion component 40 is disposed on a light existing path of a detection optical signal and is used to deflect detection optical signals of different wavelengths at different deflection angles. For example, the dispersion component 40 shown in FIG. 2*a* and FIG. 2*b* deflects the detection optical signal corresponding to the optical signal a1 of the first wavelength and the detection optical signal corresponding to the optical signal a2 of the second wavelength at different deflection angles.

For example, the optical signal outputted by one laser light source 10 passes through the first beam splitting component 50, the at least two second output ends 522 then output at least two first detection optical signals; and the optical signal outputted by another laser light source 10 passes through the first beam splitting component 50, the at least two second output ends 522 then output at least two second detection optical signals; and the optical signal outputted by a third laser light source 10 passes through the first beam splitting component 50, the at least two second output ends 522 then output at least two third detection optical signals; and the optical signal outputted by a fourth laser light source 10 passes through the first beam splitting component 50, the at least two second output ends 522 then output at least two fourth detection optical signals. Since the same second output end 522 outputs the first detection optical signal, the second detection optical signal, the third detection optical signal and the fourth detection optical signal with the same direction, the dispersion component 40 is configured to deflect, at different deflection angles, the first detection optical signal, the second detection optical signal, the third detection optical signal and the fourth detection optical signal outputted from the same second output end 522, so as to achieve scanning of the detection optical signals in this dimension at certain field of view angles.

The dispersion component 40 utilizes different refractive indexes of the detection optical signals of different wavelengths to deflect the detection optical signals of different wavelengths at different deflection angles. Specifically, the refractive index of the detection optical signal with a longer wavelength in the dispersion component 40 is smaller, and the refractive index of the detection optical signal with a smaller wavelength in the dispersion component 40 is larger. The dispersion component 40 can be any optical device that can deflect the optical path. For example, the dispersion component 40 can include a grating 41, a prism, etc., which is not limited in the present disclosure.

In this way, even if the first detection optical signal, the second detection optical signal, the third detection optical signal and the fourth detection optical signal outputted by the same second output end 522 have the same emission direction, the detection optical signals with the same emission direction can also be deflected to different directions after passing through the dispersion component 40, so that the detection field of view angles do not overlap, enabling detection of target objects in different areas, and improving a detection performance of the LiDAR 1.

That the detection field of view angles do not overlap can mean that parts of the detection field of view angles do not overlap, or all of the detection field of view angles do not overlap, etc. The degree of deflection of the optical signals by the dispersion component 40 can be designed based on actual detection requirements, and the present disclosure is not limited thereto.

It should be noted that, in order to achieve deflection of detection optical signals of different wavelengths at different deflection angles, the dispersion component 40 can deflect all of the at least two detection optical signals (such as the first detection optical signal, the second detection optical signal, the third detection optical signal and the fourth detection optical signal) outputted from the same second output end 522.

That the dispersion component 40 deflects all of the at least two detection optical signals outputted from the same second output end 522 can be understood that the dispersion component 40 deflects all of the first detection optical signal, the second detection optical signal, the third detection optical signal, and the fourth detection optical signal.

It should be noted that the dispersion component 40 can not only realize that the detection field of view angles of the detection optical signals of different wavelengths outputted through the same second output end 522 do not overlap, the dispersion component 40 can also achieve that after the at least two laser light sources 10 mentioned above all output the optical signals, the detection field of view angles of all detection optical signals (for example, M*N detection optical signals) cumulatively outputted by the first beam splitting component 50 do not overlap.

The difference between wavelengths of the optical signals emitted by different laser light sources 10 can be flexibly designed according to the actual situation. For example, the difference can be flexibly designed based on models of the laser light sources 10, material selection and specific structure of the dispersion component 40, and detection requirement of the LiDAR 1. The present disclosure is not limited thereto.

Next, the first beam splitting component 50 will be described in detail.

Figure 3:
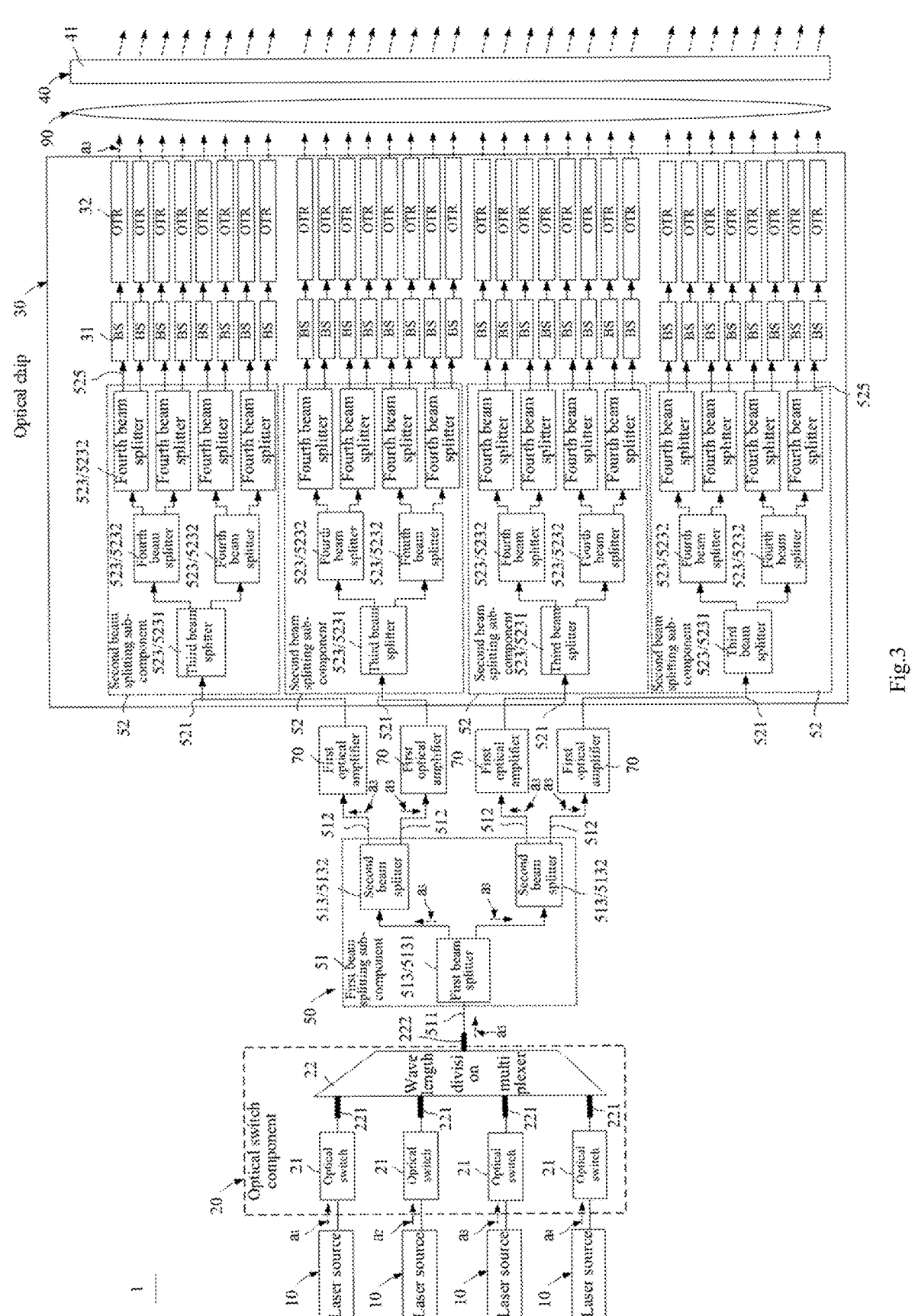
FIG. 3 is a schematic diagram of a LiDAR provided by some embodiments of the present disclosure.

Referring to FIG. 3, the first beam splitting component 50 includes a first beam splitting sub-component 51, and the optical chip 30 further includes at least two second beam splitting sub-components 52. The first beam splitting sub-component 51 includes a second input end 511 and at least two first intermediate output ends 512. The first beam splitting sub-component 51 is configured to receive, through the second input end 511, the optical signal outputted by the first output end 222, and an optical signal is outputted via each first intermediate output end 512. Each second beam splitting sub-component 52 is optically connected to each first intermediate output end 512 in a one-to-one correspondence. Each second beam splitting sub-component 52 includes a first intermediate input end 521 and at least two fifth output ends 525. Each first intermediate input end 521 is optically connected to each first intermediate output end 512 in a one-to-one correspondence, and the second beam splitting sub-component 52 is configured to receive, via the first intermediate input end 521, the optical signal outputted by the first intermediate output end 512, and output an optical signal through each fifth output end 525. By designing the first beam splitting component 50 as a multi-stage beam splitting device including the first beam splitting sub-component 51 and at least two second beam splitting sub-components 52, it is beneficial to realize that the LiDAR 1 can output more channels of optical signals.

For example, if the LiDAR 1 includes M laser light sources 10 and the first beam splitting sub-component 51 includes a second input end 511 and P first intermediate output ends 512, then the optical signal outputted by one laser light source 10 passes through the first beam splitting sub-component 51. The P first intermediate output ends 512 of the first beam splitting sub-component 51 can output P optical signals, and the optical signals outputted by the M laser light sources 10 can output M optical signals and after the M optical signals passes through the first beam splitting sub-component 51, the P first intermediate output ends 512 of the first beam splitting sub-component 51 can output M*P channels of optical signals. If the first beam splitting sub-component 51 includes P first intermediate output ends 512, then the optical chip includes P second beam splitting sub-components 52, and each second beam splitting sub-component 52 may include a first intermediate input end 521 and Q fifth output ends 525, then one optical signal outputted by one first intermediate output end 512 can pass through the corresponding second beam splitting sub-component 52, the corresponding second beam splitting sub-component 52 can output Q channels of optical signals, and the M*P channels of optical signals outputted by the first intermediate output end 512 pass through the second beam splitting sub-component 52, the fifth output ends 525 of the second beam splitting sub-component 52 can output M*P*Q channels of optical signals.

Values of M, P and Q can be flexibly designed based on actual needs and are not limited. For example, M=4, P=4, Q=8. In this way, 4*4*8=128 optical signals can be outputted from the second beam splitting sub-component 52. In this case, the optical chip 30 needs to be designed with P*Q=4*8-32 groups of beam splitters 31, optical transmitting and receiving units 32, optical mixers 33 and balanced detectors 34. If only one laser light source is designed in the related art, 128 channels of optical signal outputs need 128 groups of beam splitters, optical transmitting and receiving units, optical mixers and balanced detectors configured on the optical chip. The larger number of beam splitters, optical transmitting and receiving units, optical mixers and balanced detectors will result in a larger area of the optical chip 30.

The first beam splitting sub-component 51 includes at least one beam splitter 513. The at least one beam splitter 513 can divide one optical signal into multiple optical signals. Specifically, the at least one beam splitter 513 may be a one-to-two beam splitter, a one-to-four beam splitter, etc. In the embodiments of the present disclosure, the first beam splitting sub-component 51 includes a one-to-two beam splitter as an example for illustration.

If the first beam splitting sub-component 51 includes two first intermediate output ends 512, the first beam splitting sub-component 51 includes a one-to-two beam splitter 513, and the input end of the beam splitter 513 serves as the second input end 511 for connecting with the first output end 222, and both output ends of the beam splitter 513 serve as the first intermediate output ends 512. Referring to FIG. 3, if the first beam splitting sub-component 51 includes at least three first intermediate output ends 512, the first beam splitting sub-component 51 includes a plurality of beam splitters 513, and the plurality of beam splitters 513 include a first beam splitter 5131 and at least one second beam splitter 5132. The input end of the first beam splitter 5131 serves as the second input end 511 for connecting to the first output end 222. The input end of the second beam splitter

5132 is connected to one output end of an beam splitter 513 in the previous stage. The output ends, not connected to another beam splitter 513, of the multiple beam splitters 513 will serve as the first intermediate output ends 512.

For example, if the plurality of beam splitters 513 include a first beam splitter 5131 and a second beam splitter 5132, and one output end of the first beam splitter 5131 is connected to an input end of the second beam splitter 5132, then the other output end of the first beam splitter 5131 and the two output ends of the second beam splitter 5132 are all used as the first intermediate output ends 512, totaling three first intermediate output ends 512.

For another example, if the plurality of beam splitters 513 include a first beam splitter 5131 and two second beam splitters 5132, and the two output ends of the first beam splitter 5131 are respectively connected to the input ends of two second beam splitters 5132, then the output ends of the two second beam splitters 5132 are all used as the first intermediate output ends 512, and there are four first intermediate output ends 512 in total.

Persons skilled in the art should know that the number of beam splitters 513 included in the first beam splitting sub-component 51 and connection relations of the beam splitters 513 can be designed in conjunction with the number of first intermediate output ends 512, as stated above.

The second beam splitting sub-component 52 includes at least one beam splitter 523, which can divide one optical signal into multiple optical signals. Specifically, the beam splitter 523 can be a one-to-two beam splitter, a one-to-three beam splitter, a one-to-four beam splitter, etc. In the embodiments of the present disclosure, the second beam splitting sub-component 52 including a one-to-two beam splitter is used as an example, but is not limited thereto.

If the second beam splitting sub-component 52 includes two fifth output ends 525, the second beam splitting sub-component 52 includes a light splitter 523, and the input end of the light splitter 523 serves as the first intermediate input end 521 for connecting with the first intermediate input end 512, and two output ends of the beam splitter 523 serve as two fifth output ends 525. Referring to FIG. 3, if the second beam splitting sub-component 52 includes at least three fifth output ends 525, the second beam splitting sub-component 52 includes a plurality of beam splitters 523, and the plurality of beam splitters 523 include one third beam splitter 5231 and at least one fourth beam splitter 5232. An input end of the third beam splitter 5231 serves as the first intermediate input end 521 for connecting with the first intermediate output end 512, and the input end of the fourth beam splitter 5232 is connected to one output end of the beam splitter 523 in the previous stage. The output ends, not connected to an input end of another beam splitter 523, of the plurality of beam splitters 523 will serve as the fifth output ends 525.

Persons skilled in the art should know that the number of beam splitters 523 included in the second beam splitting sub-component 52 and connection relations of the beam splitters 523 can be designed in conjunction with the number of fifth output ends 525, as explained above.

Referring to FIG. 3, the above-mentioned at least two second beam splitting sub-components 52 can be integrated into the optical chip 30 to improve an integration degree of the FMCW LiDAR 1.

The above-mentioned first beam splitting sub-component 51 and wavelength division multiplexer 22 can be integrated into the same silicon optical chip to improve the integration level of the LiDAR 1 and facilitate assembly.

Referring to FIG. 3, the FMCW LiDAR 1 also includes at least two first optical amplifiers 70. Each first optical amplifier 70 is optically connected to a corresponding first intermediate output end 512 and a corresponding first intermediate input end 521 in a one-to-one correspondence. The first optical amplifier 70 may be a semiconductor optical amplifier, an Erbium-doped Optical Fiber Amplifier (EDFA), or the like. In this embodiment of the present disclosure, the first optical amplifier 70 is a semiconductor optical amplifier, and multiple first optical amplifiers 70 are integrated into the same silicon optical chip, thereby improving the integration degree of the FMCW LiDAR 1.

The output power of the first optical amplifier 70 is greater than or equal to 0.5 w and less than or equal to 3 w. For example, the output power of the first optical amplifier 70 can be 0.5 w, 1 w, 1.5 w, 2 w, 3 w, etc., which can be flexibly selected according to actual needs and is not limited thereto.

It should be noted that, the local oscillation optical signal can be split by the beam splitter 31, or may be split at any position in the optical path between the laser light source 10 and the beam splitter 31, and the present disclosure is not limited thereto.

Referring to FIG. 1 again, the optical transmitting and receiving unit 32 includes a polarization splitting rotator (PSR) 321 and a coupler 322. The polarization splitting rotator 321 is located on the optical path of the detection optical signal outputted by the beam splitter 31. The coupler 322 is located on the light outgoing path of the detection optical signal outputted by the polarization splitting rotator 321. The polarization splitting rotator 321 is also located on the light receiving path of the return optical signal received by the optical mixer 33. The coupler 322 is also located on the light receiving path of the return optical signal received by the polarization splitting rotator 321. The polarization splitting rotator 321 can be used to allow light signals of one polarization direction to pass through and reflect light signals of another polarization direction. In this way, for detection optical signals and return optical signals with different polarization directions, the polarization splitting rotator 321 can allow one of the detection optical signal and the return optical signal to pass through and reflect the other of the detection optical signal and the return optical signal, so as to realize that the optical path is along the desired direction. For example, the polarization splitting rotator 321 can allow the detection optical signal to pass through, so that the detection optical signal transmitted from the beam splitter 31 can pass through the polarization splitting rotator 321 and then be transmitted to the coupler 322. The polarization splitting rotator 321 can reflect the return optical signal reflected by the target object, so that the return optical signal reflected by the target object can be transmitted to the optical mixer 33 after being reflected by the polarization splitting rotator 321.

The optical mixer 33 has two input ports, one of which is used to receive the local oscillation optical signal outputted by the beam splitter 31, and the other input port is used to receive the return optical signal outputted by the optical transmitting and receiving unit 32; thus, the local oscillation optical signal and the return optical signal can generate beat frequencies in the optical mixer 33 to obtain two beat frequency optical signals, namely the first beat frequency optical signal and the second beat frequency optical signal. The optical mixer 33 is a 180° optical mixer, and the phase difference between the two optical signals outputted by the optical mixer 33 is 180°. The balanced detector 34 is connected to the two output ends of the optical mixer 33, and is used to perform balanced detection on the first beat frequency optical signal and the second beat frequency optical signal, and output an electrical signal for subsequent calculation of information about the distance and/or the speed of the target object relative to the laser LiDAR.

Referring to FIG. 2, the FMCW LiDAR 1 in the embodiments of the present disclosure may also include a lens 90 used for transmission and reception, a scanning module (not shown in the figures), etc. The present disclosure is not limited thereto.

Figures 4, 5:
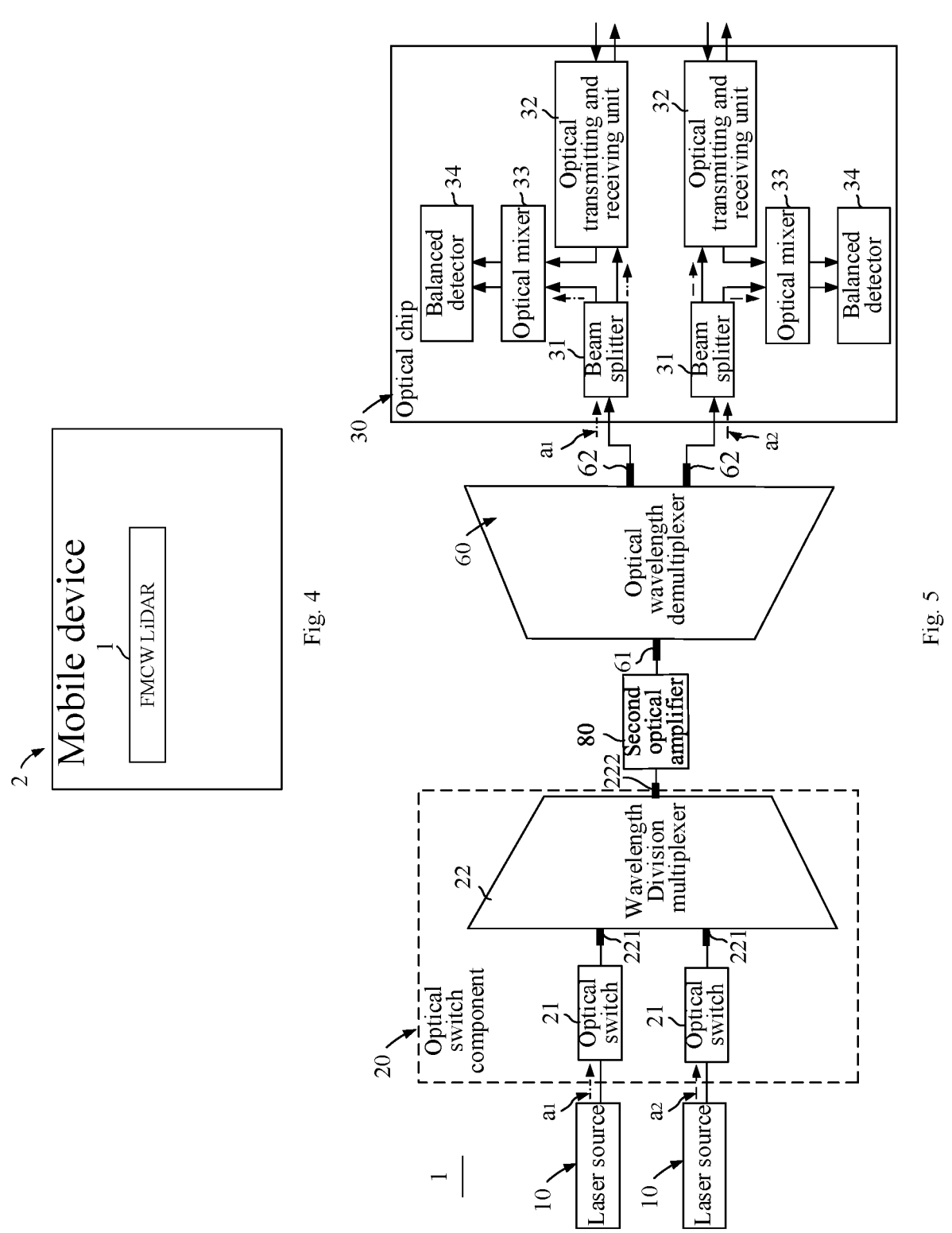
FIG. 4 is a schematic diagram of a mobile device provided by some embodiments of the present disclosure.
FIG. 5 is a schematic diagram of a LiDAR provided by some embodiments of the present disclosure.

In the second aspect, referring to FIG. 4, the embodiment of the present disclosure provides a mobile device 2. The mobile device 2 includes a FMCW LiDAR 1. A specific structure of the LiDAR 1 may be obtained by referring to the above embodiment. Since the mobile device 2 adopts all of the above-mentioned technical solutions of the embodiments, at least the mobile device 2 has all the beneficial effects brought by the technical solutions of the above embodiments which will not be described again. The mobile device may be, for example, a vehicle, an unmanned vehicle, a self-moving cleaning robot, or the like. The FMCW LiDAR 1 can be arranged, for example, on the top or on a side of the mobile device according to the needs of different scenarios, and the present disclosure is not specifically limited thereto.

Figure 6:
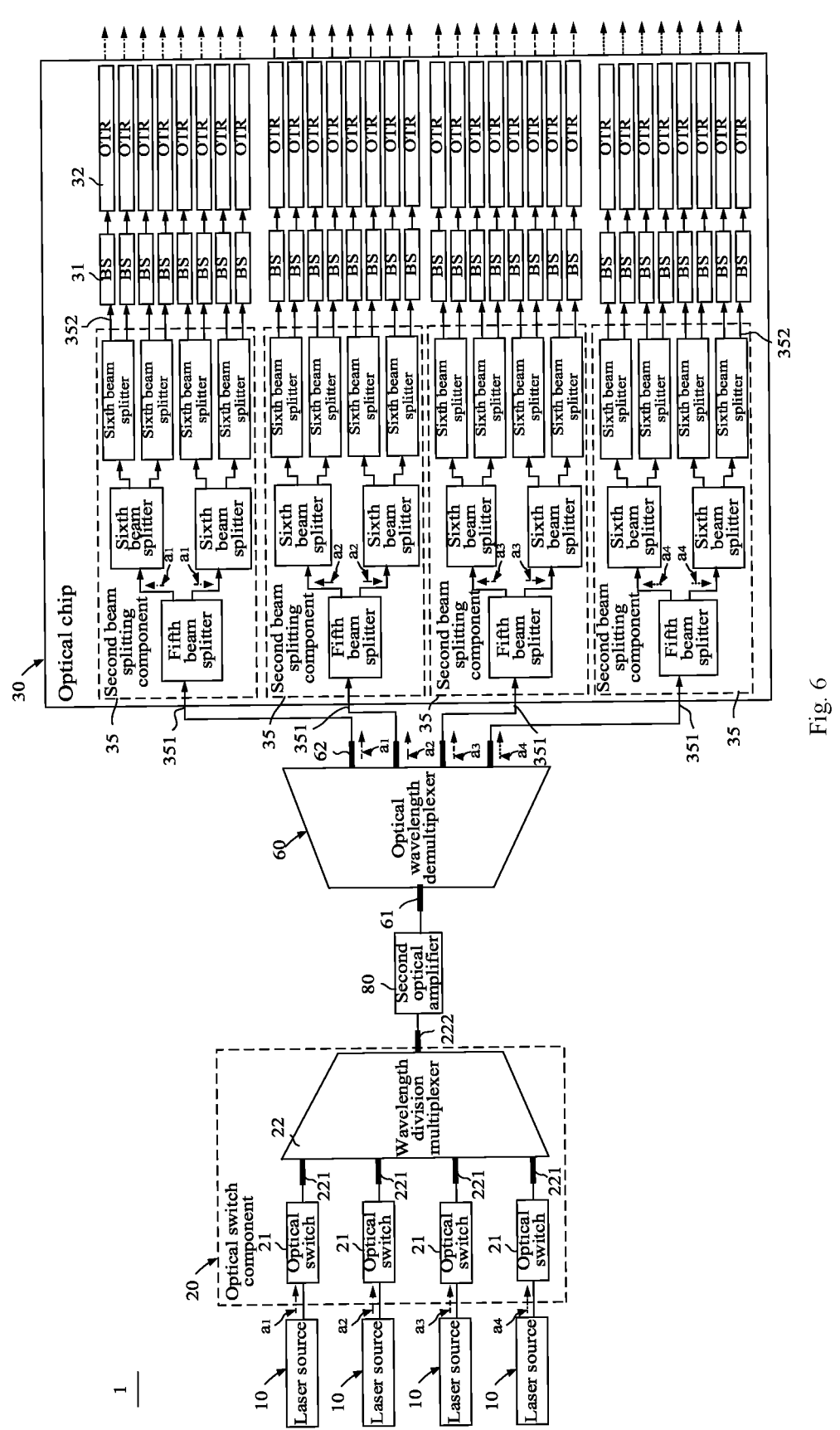
FIG. 6 is a schematic diagram of a LiDAR provided by some embodiments of the present disclosure.

Referring to FIG. 5 and FIG. 6 which show a schematic diagram different from the LiDAR 1 shown in FIG. 1 to FIG. 4. The main difference between the LiDAR 1 shown in FIG. 1 to FIG. 4 and the LiDAR in FIG. 5 and FIG. 6 is that the FMCW LiDAR 1 also includes an optical wavelength demultiplexer (DE-MUltipleXer, DEMUX) 60. The optical wavelength demultiplexer 60 includes a third input end 61 and at least two third output ends 62. The third input end 61 is connected to the first output end 222 of the wavelength division multiplexer 22. Each of the third output ends 62 outputs the optical signal corresponding to one first input end 221 of the wavelength division multiplexer 22 in a one-to-one correspondence in a time-division manner. That is, optical signals of different wavelengths are outputted through different third output ends 62 to achieve detection of different areas of the target object.

It should be noted that, compared with the LiDAR 1 shown in FIG. 1 to FIG. 3, the embodiments of the present disclosure have optical signals outputted by different laser light sources 10 through different third output ends 62, that is, the same third output end 62 does not output optical signals with different wavelengths, so there is no need to provide dispersion components.

Further, referring to FIG. 6, the optical chip 30 further includes at least two second beam splitting components 35. Each second beam splitting component 35 is optically connected to a corresponding third output end 62 in a one-to-one correspondence. Each second beam splitting component 35 includes a fourth input end 351 and at least two fourth output ends 352. Each fourth input end 351 is optically connected to a corresponding third output end 62 in a one-to-one correspondence. The second beam splitting component 35 is configured to receive, via the fourth input end 351, the optical signal outputted by the third output end 62 and outputs an optical signal via each fourth output end 352. Each second light splitter component 35 includes a plurality of beam splitters. The multiple beam splitters include a fifth beam splitter and at least one sixth beam splitter. An input end of the fifth beam splitter serves as the fourth input end 351 for optically connecting with the third input end 62 in a one-to-one correspondence. The input end of the sixth beam splitter is connected to an output end of an beam splitter in a previous stage. The output ends, not connecting to the input end of another sixth beam splitter, of the plurality of sixth beam splitters are used as the fourth output ends.

Optionally, the fifth and the sixth beam splitters in the optical chip can be replaced by optical switches, such as 1×2 optical switches, which can achieve the same function. Optical switches can be thermal-sensitive cascaded MZM switches with low insertion loss. In order to save space, details of the optical switches will not be described in detail here.

Optionally, part of the fifth and sixth beam splitters in the optical chip may be beam splitters, and the other part of the fifth and sixth beam splitters in the optical chip may be replaced by the optical switches, the same function can be achieved. In order to save space, detailed description is not provided again in the present application.

In this case, the optical chip 30 includes at least two beam splitters 31, at least two optical transmitting and receiving units 32, at least two optical mixers 33 and at least two balanced detectors 34. Each beam splitter 31 is optically connected to one corresponding fourth output end 352 in a one-to-one correspondence, each beam splitter 31 is optically connected to a corresponding optical transmitting and receiving unit 32 in a one-to-one correspondence, and each optical transmitting and receiving unit 32 is optically connected to a corresponding optical mixer 33 in a one-to-one correspondence. Each optical mixer 33 is optically connected to a corresponding beam splitter 31 in a one-to-one correspondence, and each optical mixer 33 is optically connected to a corresponding balanced detector 34 in a one-to-one correspondence.

The LiDAR 1 also includes a second optical amplifier 80. The second optical amplifier 80 is optically connected between the first output end 222 of the wavelength division multiplexer 22 and the third input end 61 of the optical wavelength demultiplexer 60, so that the second optical amplifier 80 can amplify the optical signals outputted by each laser light source 10, to increase the detection range of the LiDAR 1. It should be noted that the second optical amplifier 80 can only amplify an optical signal of a single wavelength at any time.

It should be noted that in the embodiments of the present disclosure, the second optical amplifier 80 is provided between the wavelength division multiplexer 22 and the optical wavelength demultiplexer 60. Compared with the case in which the second optical amplifier is provided at upstream of the optical path of the wavelength division multiplexer 22 or the downstream of the optical path of the optical wavelength demultiplexer 60, only one second optical amplifier 80 can amplify the optical signals outputted by multiple laser light sources 10, thereby reducing the manufacturing cost of the LiDAR 1.

The second optical amplifier 80 may be a semiconductor optical amplifier, an erbium-doped fiber amplifier, or the like. In the embodiments of the present disclosure, the second optical amplifier 80 is an erbium-doped fiber amplifier. Compared with semiconductor optical amplifiers, the erbium-doped fiber amplifiers are generally independently formed and the output power can be larger, which is beneficial to improving the detection distance of the LiDAR 1.

The output power of the second optical amplifier 80 is greater than or equal to 1 w and less than or equal to 5 w. For example, the output power of the second optical amplifier 80 can be 1 w, 2 w, 3 w, 4 w, 5 w, etc., which can be flexibly selected according to actual needs and is not limited.

In this embodiment, the second beam splitting component 35 can adopt a non-uniform beam splitting ratio according to detection requirements. For example, the detection power of the middle channel is higher than those of the edge channels, and the detection distance of the middle channel is increased. The edge channels can be used to detect short-range target objects such as short-range sky and short-range road surface, which do not require a particularly large detection distance.

For example, referring to FIG. 6, if the LiDAR 1 includes two laser light sources 10, the optical signal emitted by each laser light source 10 can be split into 16 optical signals by the optical chip 30 after being split by four second beam splitting components 35. Thus, the two laser light sources 10 can output 32 optical signals from the optical chip 30. Among the 32 optical signals, the output power of the 8 optical signals located at one edge can be 0.5 w, and the 8 optical signals located at the other edge can have an output power of 0.5 w. The output power of the 8 optical signals in the middle can be 2 w, while the output power of the 8 optical signals between the two edges and the middle can be 1 w.

In the LiDAR and the mobile device of the present disclosure, at least two laser light sources are provided, and the optical signals emitted by the at least two laser light sources can be outputted through the first output end of the wavelength division multiplexer. In this way, the optical signals emitted by the at least two laser light sources can be used to detect the target object by using the beam splitters, optical transmitting and receiving units, optical mixers and balanced detectors on the optical chip. Compared with the case in the related art that only one laser light source is provided and one laser light source corresponds to an beam splitter, an optical transmitting and receiving unit, an optical mixer and a balanced detector, the at least two laser light sources in the embodiments of the present disclosure can reduce the number of beam splitters, optical transmitting and receiving units, optical mixers and balanced detectors on the optical chip, reduce the size of the optical chip, and realize miniaturization of the LiDAR, while implementing the same number of detection channels. Additionally, the number of lines of vertical scanning of LiDAR can be increased without increasing the number of laser light resources and the output of the trans-impedance amplification chip (TIA), by configuring multiple beam splitters, multiple optical transceivers and receivers, multiple optical mixers and multiple balanced detectors.

In the description of the present disclosure, it needs to be understood that the terms "first", "second", etc. are used for descriptive purposes only and are not to be understood as indicating or implying relative importance. For those of ordinary skill in the art, the specific meanings of the above terms in the present disclosure can be understood on a case-by-case basis. Furthermore, in the description of the present disclosure, "plurality" means at least two, for example, two, three, four, etc., unless otherwise specified. "And/or" describes the relationship between related objects, indicating that there can be three relationships. For example, A and/or B can mean: A exists alone, A and B exist simultaneously, and B exists alone. The character "/" generally indicates that the related objects are in the "or" relationship.

What is disclosed above is only the preferred embodiments of the present disclosure, of course, cannot be used to limit the protection scope of the present disclosure. Therefore, equivalent changes made according to the claims of the present disclosure still fall within the protection scope of the present disclosure.

What is claimed is:

1. A light detection and ranging system, comprising:
   at least two laser light sources, wherein the at least two laser light sources are configured to emit at least two optical signals, and wavelengths of the at least two optical signals emitted by the at least two laser light sources are different;
   an optical switch component, wherein the optical switch component comprises at least two optical switches and a wavelength division multiplexer optically connected to the at least two optical switches, and a quantity of the at least two optical switches is equal to a quantity of the at least two laser light sources; each of the at least two optical switches is optically connected to a corresponding one of the at least two laser light resources, and the wavelength division multiplexer comprises at least two first input ends and a first output end, each of the at least two first input ends is optically connected to one corresponding optical switch of the at least two optical switches to receive an optical signal passing through the one corresponding optical switch, and the first output end of the wavelength division multiplexer outputs the at least two optical signals of at least two laser light resources;
   an optical chip, configured to emit a portion of each of the at least two optical signals and receive a return optical signal reflected by a target object after the portion of each of the at least two optical signals is incident on the target object, and detect the return optical signal, wherein the detected return optical signal is used to calculate a distance and/or a speed of the target object relative to the light detection and ranging system; and
   a first beam splitting component, arranged between the wavelength division multiplexer and the optical chip, and comprising a second input end and at least two second output ends, wherein the second input end is connected to the first output end of the wavelength division multiplexer, and the first beam splitting component is configured to split each of the at least two optical signals into at least two optical sub-signals, the at least two optical sub-signals are outputted through the at least two second output ends;
   wherein, the optical chip comprises at least two beam splitters, each of the at least two beam splitters is optically connected to one of the at least two second output ends, and is configured to split each of the at least two optical sub-signals into a detection optical signal and a local oscillation optical signal.

2. The light detection and ranging system according to claim 1, wherein the optical chip divides each of the at least two optical signals into a detection optical signal and a local oscillation optical signal, the light detection and ranging system further comprises:
   a dispersion component, arranged on a light existing path of the optical chip and configured to deflect detection optical signals of the at least two optical signals at different deflection angles.

3. The light detection and ranging system according to claim 2, wherein the dispersion component comprises a grating and/or a prism.

4. The light detection and ranging system according to claim 1, wherein the at least two optical switches comprise at least two semiconductor optical amplifiers, each of the at least two semiconductor optical amplifiers is configured to amplify a corresponding one of the at least two optical signals, wherein the at least two semiconductor optical amplifiers are turned on in a time-division manner, so that the first output end of the wavelength division multiplexer outputs the at least two optical signals in a time division manner.

5. The light detection and ranging system according to claim 1, wherein the first beam splitting component comprises:

a first beam splitting sub-component, comprising the second input end and at least two first intermediate output ends, wherein the first beam splitting sub-component is configured to receive, via the second input end, the at least two optical signals outputted from the first output end, and outputs a part of the at least two optical signals through each of the first intermediate output ends.

6. The light detection and ranging system according to claim 5, wherein the first beam splitting sub-component comprises at least two stages of first beam splitters, an output end of a first beam splitter in a first stage of the at least two stages is optically connected to an input end of a first beam splitter in a second stage of the at least two stages.

7. The light detection and ranging system according to claim 6, wherein the at least two stages of first beam splitters comprise S stages of first beam splitters, one or more output ends of one or more first beam splitters in a (S−1)-th stage of the S stages and output ends of one or more first beam splitters in a S-th stage are used as the at least two second output ends, wherein S is a positive integer larger than or equal to 1.

8. The light detection and ranging system according to claim 6, wherein the optical chip further comprises at least two second beam splitting sub-components, each of the at least two second beam splitting sub-components is optically connected to one of the at least two first intermediate output ends, and each of the at least two second beam splitting sub-components comprises a first intermediate input end and at least two fifth output ends, each first intermediate input end is optically connected to a corresponding first intermediate output end of the at least two first intermediate output ends, and each of the at least two second beam splitting sub-components is configured to receive, via the first intermediate input end, a portion of the at least two optical signals outputted by the corresponding first intermediate output end, and output an optical signal in the portion of the at least two optical signals via each of the at least two fifth output ends.

9. The light detection and ranging system according to claim 8, further comprising:

at least two first optical amplifiers, wherein each of the at least two first optical amplifiers is optically connected to one of the at least two first intermediate output ends and one of at least two intermediate input ends of the at least two second beam splitting sub-components, and is configured to amplify an optical signal outputted from the one of the at least two first intermediate output ends.

10. The light detection and ranging system according to claim 1, wherein the optical chip comprises:

at least two beam splitters, configured to split each of the at least two optical signals into a local oscillation optical signal and a detection optical signal;

an optical transmitting and receiving unit, configured to receive the detection optical signal from the at least two beam splitters and transmit the detection optical signal to an external environment and receives the return optical signal formed by reflection of the detection optical signal incident on the target object;

an optical mixer, configured to receive the local oscillation optical signal from the at least two beam splitters and mix the return optical signal with the local oscillation optical signal to generate a mixed signal;

a balanced detector, configured to receive the mixed signal from the optical mixer and converts the mixed signal into an electrical signal to facilitate subsequent calculation of the distance and/or the speed of the target object relative to the light detection and ranging system.

11. The light detection and ranging system according to claim 10, wherein the optical transmitting and receiving unit comprises a polarization splitting rotator and a coupler, the polarization splitting rotator is located at a light outgoing path of the detection optical signal outputted by a corresponding beam splitter of the at least two beam splitter, the coupler is located on the light outgoing path of the detection optical signal outputted by the polarization splitting rotator, and the polarization splitting rotator is also located on a light return path of the return optical signal received by the optical mixer, the coupler is also located on a light return path of the return optical signal received by the polarization splitting rotator.

12. A mobile device, comprising:

a light detection and ranging system, wherein the light detection and ranging system comprises:

at least two laser light sources, wherein the at least two laser light sources are configured to emit at least two optical signals, and wavelengths of the at least two optical signals emitted by the at least two laser light sources are different;

an optical switch component, wherein the optical switch component comprises at least two optical switches and a wavelength division multiplexer optically connected to the at least two optical switches, and a quantity of the at least two optical switches is equal to a quantity of the at least two laser light sources; each of the at least two optical switches is optically connected to a corresponding one of the at least two laser light resources, and the wavelength division multiplexer comprises at least two first input ends and a first output end, each of the at least two first input ends is optically connected to one corresponding optical switch of the at least two optical switches to receive an optical signal passing through the one corresponding optical switch, and the first output end of the wavelength division multiplexer outputs the at least two optical signals of at least two laser light resources;

an optical chip, configured to emit a portion of each of the at least two optical signals and receive a return optical signal reflected by a target object after the portion of each of the at least two optical signals is incident on the target object, and detect the return optical signal, wherein the detected return optical signal is used to calculate a distance and/or a speed of the target object relative to the light detection and ranging system; and a first beam splitting component, arranged between the wavelength division multiplexer and the optical chip, and comprising a second input end and at least two second output ends, wherein the second input end is connected to the first output end of the wavelength division multiplexer, and the first beam splitting component is configured to split each of the at least two optical signals into at least two optical sub-signals, the at least two optical sub-signals are outputted through the at least two second output ends;

wherein, the optical chip comprises at least two beam splitters, each of the at least two beam splitters is optically connected to one of the at least two second output ends, and is configured to split each of the at least two optical sub-signals into a detection optical signal and a local oscillation optical signal.

\* \* \* \* \*